United States Patent
Ikeda et al.

(10) Patent No.: US 6,840,626 B2
(45) Date of Patent: Jan. 11, 2005

(54) COLOR SEPARATING/SYNTHESIZING ELEMENT AND LIQUID CRYSTAL PROJECTOR USING IT

(75) Inventors: Takashi Ikeda, Osaka (JP); Toshio Obase, Osaka (JP); Kensuke Konishi, Osaka (JP); Yoshitaka Kurosaka, Hyogo (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 10/181,936

(22) PCT Filed: Nov. 26, 2001

(86) PCT No.: PCT/JP01/10296

§ 371 (c)(1),
(2), (4) Date: Jul. 30, 2002

(87) PCT Pub. No.: WO02/42807

PCT Pub. Date: May 30, 2002

(65) Prior Publication Data

US 2003/0011752 A1 Jan. 16, 2003

(30) Foreign Application Priority Data

Nov. 27, 2000 (JP) .................................... 2000-359978

(51) Int. Cl.[7] ........................... G03B 21/00; G03B 21/14
(52) U.S. Cl. ............................... 353/33; 353/31; 353/81
(58) Field of Search ................... 353/8, 20, 28, 353/30–34, 81, 122; 359/496–502; 349/5–10

(56) References Cited

U.S. PATENT DOCUMENTS

| | | | | |
|---|---|---|---|---|
| 5,749,641 A | * | 5/1998 | Brice et al. ............. | 353/81 |
| 6,089,719 A | * | 7/2000 | Lin ........................ | 353/33 |
| 6,183,091 B1 | * | 2/2001 | Johnson et al. .......... | 353/20 |
| 6,273,567 B1 | * | 8/2001 | Conner et al. ........... | 353/20 |
| 6,327,093 B1 | * | 12/2001 | Nakanishi et al. ....... | 359/634 |
| 6,486,997 B1 | * | 11/2002 | Bruzzone et al. ........ | 359/247 |
| 6,565,211 B1 | * | 5/2003 | Sekine et al. ........... | 353/20 |
| 2002/0080331 A1 | * | 6/2002 | Na ........................ | 353/20 |

FOREIGN PATENT DOCUMENTS

| | | |
|---|---|---|
| EP | 0 857 986 A1 | 8/1998 |
| EP | 0 938 014 A1 | 8/1999 |
| JP | 5-27201 | 2/1993 |
| JP | 10-260313 | 9/1998 |
| JP | 2000-284228 | 10/2000 |
| JP | 2001-281615 | 10/2001 |

\* cited by examiner

*Primary Examiner*—Judy Nguyen
*Assistant Examiner*—Andrew Sever
(74) *Attorney, Agent, or Firm*—Westerman, Hattori, Daniels & Adrian, LLP

(57) ABSTRACT

A color separating/recombining unit used in liquid crystal projector using three reflection type liquid crystal panels. The color separating/recombining unit (20) has a cubic form comprising a light incidence surface (21) facing the light source unit (10), three light incidence/output surfaces (23), (24), (25) respectively facing liquid crystal panels (31), (32), (33), a light output surface (22) facing a projection optical system (40), and another surface (26). The color separating/recombining unit has thereinside a color separating/recombining means (50) that spectrally separates light shone from the light source (10) into three-primary-color components to allow them emit from corresponding light incidence/output surfaces (23), (24), (25) and to be reflected with their polarization directions rotated 90 degrees by the liquid crystal panels (31), (32), (33) disposed respectively facing the light incidence/output surfaces (23), (24), (25), then recombines them, and emits them from the light output surface (22) to the projection optical system (40).

7 Claims, 7 Drawing Sheets

COLOR SEPARATING/SYNTHESIZING ELEMENT AND LIQUID CRYSTAL PROJECTOR USING IT

TECHNICAL FIELD

This invention relates to a color separating/recombining unit for LCD projector using three reflective LCD panels, and a compact LCD projector using this color separating/recombining unit.

BACKGROUND ART

Now a description is made of a conventional LCD projector by referring to FIG. 10.

As shown in the plan of FIG. 10, the conventional LCD projector using three LCD panels, comprises a light source unit 1, a color separating/recombining unit 2, a reflective light modulating unit 3 consisting of three LCD panels 31, 32, 33 that modulate separated color components to convert into image lights of each color, and a projection optical system 4 including a projection lens.

The light source unit 1 comprises a lamp 11a, a reflector 11b and polarization conversion means (not shown) that converts light from the lamp 11a into polarized light having a given polarization direction, so that the light source unit 1 may emit light polarized in a particular polarization direction. The color separating/recombining unit 2 is provided with two dichroic mirrors 21, 23 and one reflective mirror 22 to separate light incident from the light source unit 1 into three primary color components. In this projector, light emitted from the light source unit 1 is converted into s-polarized light by the polarization conversion means.

Of the light emitted from the light source unit 1, for example, s-polarized light of a red component reflects perpendicularly off a first dichroic mirror 21 and a blue component and a green component pass through the first dichroic mirror 21 and the separated red component enters a first polarizing beam splitter (hereafter referred to as PBS), namely a PBS for red 24.

The s-polarized light of the blue component and the s-polarized light of the green component, which pass through the first dichroic mirror 21, reflect perpendicularly off the reflective mirror 22 and enter a second dichroic mirror 23. The blue component passes through the second dichroic mirror 23, while the green component reflects off the second dichroic mirror 23.

The s-polarized light of the blue component, which passes through the second dichroic mirror 23, enters a second PBS, namely a PBS for blue 25, while the s-polarized light of the green component, which reflects perpendicularly off the second dichroic mirror 23, enters a third PBS, namely a PBS for green 26.

The PBS for red 24 comprises a polarized light separating surface 24a inside, which s-polarized light reflects perpendicularly and p-polarized light passes through. After being emitted from the first dichroic mirror 21, the red component reflects perpendicularly off the PBS for red 24 toward a first LCD panel 31. On the basis of image information for red, the LCD panel 31 rotates the polarization direction of the red light 90 degrees, which entered the part to be displayed in red, that is, the LCD panel 31 converts s-polarized red light into p-polarized red light and reflects it. The p-polarized red image light, which is reflected by the LCD panel 31, passes through the PBS for red 24 and enters a dichroic prism for recombining 27.

The PBS for blue 25 comprises a polarized light separating surface 25a inside, which s-polarized light reflects perpendicularly and p-polarized light passes through. After passing through the second dichroic mirror 23, s-polarized light of the blue component reflects perpendicularly off the PBS for blue 25 toward a second LCD panel 32. P-polarized blue image light, which is reflected by the LCD panel 32, passes through the PBS for blue 25 and enters the dichroic prism for recombining 27 from the opposite side where the red image light enters.

The PBS for green 26 comprises a polarized light separating surface 26a inside, which s-polarized light reflects perpendicularly and p-polarized light passes through. After reflecting off the second dichroic mirror 23, s-polarized light of the green component reflects perpendicularly off the PBS for green 26 toward a third LCD panel 33. P-polarized green image light which is reflected by the LCD panel 33, passes through the PBS for green 26 and enters the dichroic prism for recombining 27 from a side orthogonal to sides where the red image light and the blue image light enter.

The inside of the dichroic prism for recombining 27 comprises two dichroic surfaces 27a, 27b intersecting with each other at right angles. The first dichroic surface 27a that the blue image light perpendicularly reflects off and the red image light and the green image light pass through, recombines the blue image light and the green image light. The second dichroic surface 27b that the blue image light and the green image light pass through and the red image light perpendicularly reflects off. As a result, the image lights of these three primary colors are recombined.

As shown in the plan of FIG. 11, another conventional LCD projector using three LCD panels comprises a polarizing plate 12 transmitting only p-polarized light of white light emitted from a light source unit 1 provided with a light source 11 comprising a lamp 11a and a reflector 11b.

A color separating/recombining unit 5 comprises a narrow-band retardation plate 51, which rotates a polarization direction 90 degrees, of p-polarized light having predetermined wavelength, for example only a red component, to convert into s-polarized light, a PBS for separating red 52, a PBS for red 53, two narrow-band retardation plates 54, 56, which rotate a polarization direction of only p-polarized light of the blue component by 90 degrees to convert into s-polarized light, a PBS for separating/recombining blue and green 55, and a PBS for recombining 57.

Although white light emitted from the lamp 11a is emitted as p-polarized white light by the polarizing plate 12, the first narrow-band retardation plate 51 converts only red component into s-polarized light.

The s-polarized light of the red component reflects perpendicularly off the PBS for separating red 52 and the PBS for red 53, and goes to LCD panel for red 31.

P-polarized light of the blue component, which passes through the PBS for separating red 52, is rotated its polarization direction 90 degrees to be converted into s-polarized light by the second narrow-band retardation plate 54. The s-polarized light of the blue component reflects perpendicularly off the PBS for separating/recombining blue and green 55 to enter LCD panel for blue 32.

P-polarized light of the green component, which passes through the PBS for separating red 52, passes through the second narrow-band retardation plate 54 and the PBS for separating/recombining blue and green 55 to enter LCD panel for green 33.

These reflective LCD panels 31, 32, 33 rotate the polarization direction 90 degrees, of light which is incident to pixels to be displayed on the basis of image information on each color, and reflect the light in the opposite direction from which the light entered. Light, which is incident to pixels and not displayed, is reflected by the LCD panels in the opposite direction from which the light entered without changing its polarization direction.

Since the red image light reflected by the LCD panel for red 31 is p-polarized light, the red image light passes though the PBS for red 53 and the PBS for recombining 57 to enter a projection optical system 4. Since the blue image light reflected by the LCD panel for blue 32 is p-polarized light, after passing through the PBS for separating/recombining blue and green 55 and being converted to s-polarized light by the third narrow-band retardation plate 56 again, the blue image light reflects perpendicularly off the PBS for recombining 57 to enter the projection optical system 4.

Since the green image light reflected by the LCD panel for green 33 is s-polarized light, after reflecting perpendicularly off the PBS for separating/recombining blue and green 55 and passing through the third narrow-band retardation plate 56, the green image light reflects perpendicularly off the PBS for recombining 57 to enter the projection optical system 4.

In the conventional LCD projector of FIG. 10, the PBS for red 24, the PBS for blue 25, the PBS for green 26 and the dichroic prism for recombining 27 are each formed in a cube. In consideration of diffusion of light occurring between the light source unit 1 and the projection optical system 4, one side of each surface of these cubes should be longer than one side (or longer side) of each LCD panel 31, 32, 33. The two dichroic mirrors 21, 23 and the total reflective mirror 22 should be formed in rectangular so that the projected light in an incident direction and in a reflecting direction becomes a square bigger than an area of each LCD panel 31, 32, 33.

By so designing, the color separating/recombining unit 2 requires an area more than nine times larger than one of the PBS 24, 25, 26 or the dichroic prism 27, which is unfavorable in miniaturizing the color separating/recombining unit 2 and LCD projector using the unit. Also, since the path length for each color component between each LCD panels 31, 32, 33 and the projection optical system 4 is long, an aperture size of the projection optical system 4 should be big enough, which makes miniaturization of the LCD projector difficult.

In the conventional LCD projector in FIG. 11, the color separating/recombining unit 5 would be smaller than that in FIG. 10 because four PBSs 52, 53, 55, 57 are arranged in two lines horizontally and vertically on a two-dimensional view.

However further miniaturization of the color separating/recombining unit 5 has been considered impossible because the idea that color components in the color separating/recombining unit 5 must be separated and recombined in a plan is deeply rooted.

Considering these circumstances, we successfully achieved a remarkably small color separating/recombining unit as compared with the conventional ones by three-dimensionally separating and recombining color components through various trials and errors, and finally completed our invention.

The present invention has an object to provide a remarkable miniature color separating/recombining means and a compact LCD projector.

DISCLOSURE OF INVENTION

A color separating/recombining unit of the present invention is made to achieve the above mentioned object and characterized by being formed in a cube with a light incidence surface facing a light source unit which emits light having a predetermined polarization direction, three light incidence/output surfaces each facing reflective light modulating elements, a light output surface facing a projection optical system and another surface, and by comprising a color separating/recombining means inside. The color separating/recombining means separates light emitted from the light source unit into three primary color components and emits each separated color component from the corresponding light incidence/output surfaces. After recombining lights of three primary color components reflected from a reflective light modulating element which is disposed opposite to each light incidence/output surface and rotates a polarization direction of the lights by 90 degrees, the color separating/recombining means emits the recombined color component toward a projection optical system.

In this structure, reguarding the light source unit, the projection optical system and a reflective light modulating element (LCD panel) is placed opposed to each surface of the color separating/recombining unit. It never aligned the light source unit and one reflective modulating element (LCD panel), one reflective light modulating element (LCD panel) and the projection optical system, or two reflective light modulating elements (LCD panels) side by side, thereby miniaturizing the color separating/recombining unit to one-fourth as compared to the conventional one in FIG. 11.

Also in this structure, an optical path between the light source unit and each reflective light modulating element (LCD panel) through the color separating/recombining unit and an optical path between each reflective light modulating element (LCD panel) and the projection optical system through the color separating/recombining unit can be shorten, therefore reducing diffusion of light. This also reduces power output of the light source unit and makes the light source unit and the projection optical system small, thereby obtaining further miniaturized LCD projector as a whole.

By the way, we refer to a parallelepiped whose six surfaces are all squares as a cube. The LCD projector of the present invention is so structured that five surfaces out of six surfaces of the cube respectively faces a light source unit, one of three reflective light modulating elements (LCD panels) or a projection optical system.

In this invention the position of the light incidence surface, the light incidence/output surfaces, the light output surface is not limited. The light incidence surface, for example, may be arranged at the back of the light output surface in the cube and the light incidence/output surfaces may be arranged on three surfaces out of four surfaces orthogonal to both the light incidence surface and the light output surface.

In order to simplify the structure of the color separating/recombining means as well as to miniaturize the color separating/recombining unit, it is preferable to have such structure that the light incidence surface and the light output surface are orthogonal to each other, the first light incidence/output surface is arranged at the back of the light incidence surface, the second light incidence/output surface is arranged at the back of the light output surface, and the third light incidence/output surface is orthogonal to the first, second light incidence/output surfaces, the light incidence surface and the light output surface.

By arranging the light incidence surface, three light incidence/output surfaces, and the light output surface in this way, the color separating/recombining means can be simplified down to one comprising just three optical surfaces.

In other words, the color separating/recombining means may comprise a first optical surface inclined at a 45-degree angle to the light incidence surface and the light output surface, a second optical surface inclined at a 45-degree angle to the first and third light incidence/output surfaces, and a third optical surface inclined at a 45-degree angle to the third light incidence/output surface and the light output surface.

The properties of each optical surface may be so designed that, on the basis of the polarization direction of three primary color components, the optical surfaces separate light incident from the light incidence surface into three color components, emit the color components in three directions orthogonal to each other, recombine the color components incident from the opposite direction, and emit the recombined color components from the light output surface.

The color separating/recombining means is structured, for example, so that the first optical surface transmits both s-polarized light and p-polarized light of a first component, and reflects s-polarized light of a second and third components while transmitting p-polarized light. The second and third optical surfaces reflect s-polarized light of the first component while transmitting p-polarized light, and transmit both polarized lights of the second and third components.

It is necessary to distinguish a polarization direction of one color component of the three primary color components incident from the light source unit to the light incidence surface, from the other two color components by means of a narrow-band retardation plate, a PBS or the like. The LCD projector in this invention comprises the above mentioned color separating/recombining unit, a light source unit disposed on the light incidence surface side of the color separating/recombining unit and emitting light having predetermined polarization direction, a first, second and third reflective light modulating elements each disposed on the light incidence/output surface side of the color separating/recombining unit, and a projection optical system disposed on the light output surface side of the color separating/recombining unit.

The light source unit comprises a white light source, a polarization conversion means for converting light from the white light source into light having a predetermined polarization direction, and means for rotating a polarization direction of light having a particular wavelength by 90 degrees.

In this structure, the LCD projector using three LCD panels can be made remarkably small as compared to the conventional projector.

Although the method of fabricating the color separating/recombining unit in a cube, which has three optical surfaces inside, is not particularly limited, one example can be adopted. The method includes; dividing the color separating/recombining unit into six tetrahedrons; forming optical surfaces having a predetermined property on one divided surface or both divided surfaces facing each other by, for example, a well-known method for forming thin film; and joining the tetrahedrons to be a cube.

BEST MODE FOR CARRYING OUT THE INVENTION

Figure 1:
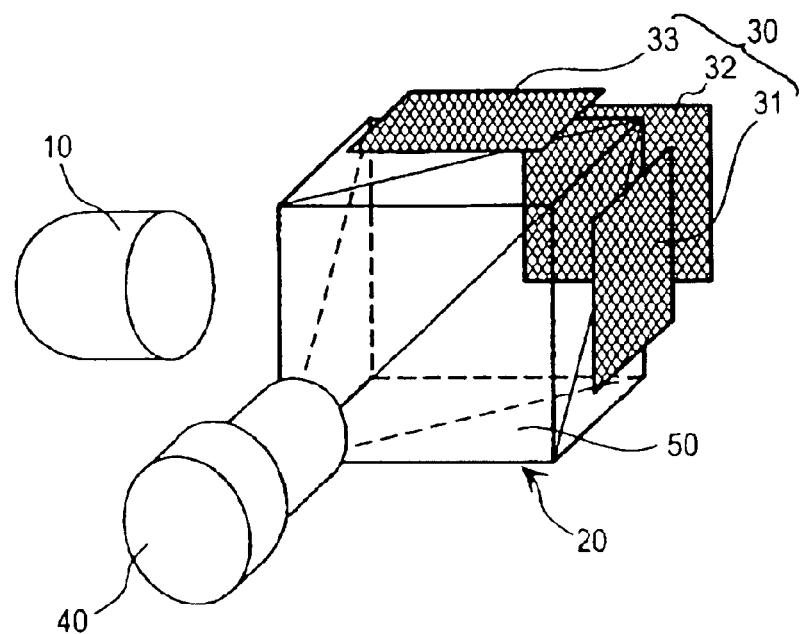
FIG. 1 is a perspective view showing a LCD projector according to the present invention.

LCD projector shown in a perspective view of FIG. 1 comprises a light source unit 10, a color separating/recombining unit 20 characterizing an embodiment of this invention, a color component modulation unit 30 including three reflective LCD panels 31, 32, 33, and a projection optical system 40. Light, which is emitted from the light source unit 10 and has a predetermined polarization direction, enters a light incidence surface 21 being one of the surfaces of the color separating/recombining unit 20 and is separated into three primary color components—in this embodiment, a blue component as a first color component, a green component as a second color component and a red component as a third color component—by a color separating/recombining means 50 in the color separating/recombining unit 20. The three color components are recombined after modulated by the color component modulation unit 30. The recombined color component is emitted from a light output surface 22 orthogonal to the light incidence surface 21 and projected and magnified by the projection optical system 40.

Figure 2:
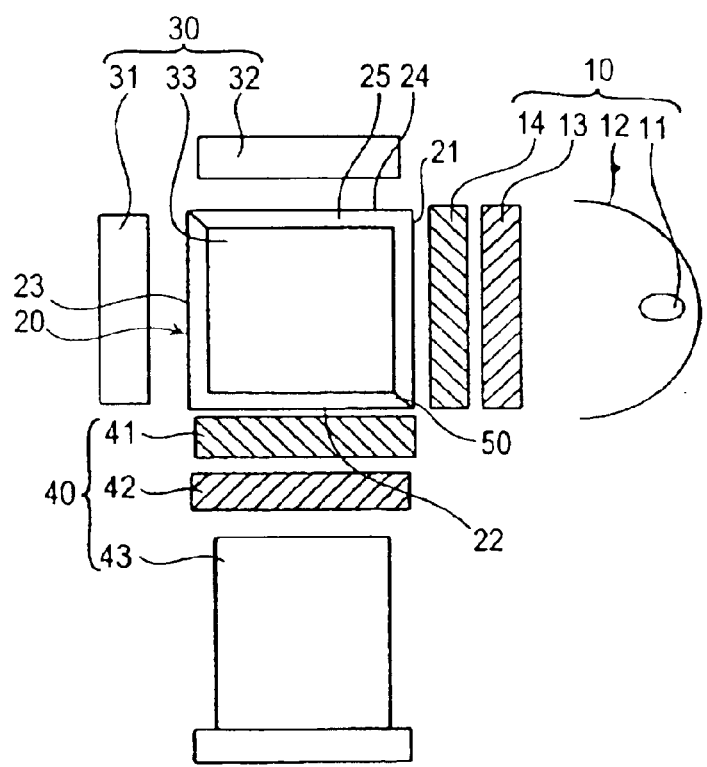
FIG. 2 is a plan showing the LCD projector according to the present invention.
Figure 3:
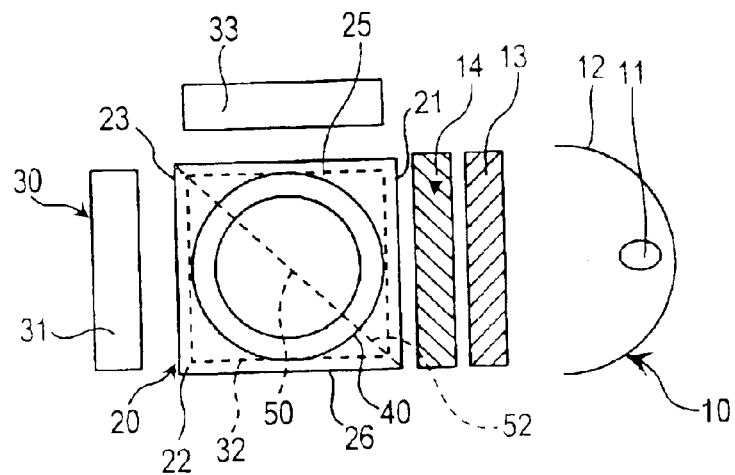
FIG. 3 is a front view showing the LCD projector according to the present invention.

As shown in a plan of FIG. 2 and a front view of FIG. 3, the light source unit 10 comprises a lamp 11, a reflector 12 which reflects light from the lamp 11 toward the light incidence surface 21, a polarizer 13 and a narrow-band retardation plate 14 which arrange the light heading for the light incidence surface 21 to have a predetermined polarization direction. In this embodiment, for example, the polarizer 13 transmits only light having a polarization direction (horizontal direction), which is indicated by arrowheads with an inclined solid line in a perspective view of FIG. 4. A polarization direction of one color component—for example, green component—of the light passed through the polarizing plate 13 is rotated 90 degrees by the narrow-band retardation plate 14 to have a polarization direction (vertical direction) as indicated by arrowheads with a vertical solid line in a perspective view of FIG. 4.

As an alternative to the narrow-band retardation plate, a combination of a dichroic mirror and a retardation plate can be used to obtain equivalent effect.

By the way, p-polarized light is light vibrating in a plane including incident light, transmissive light and reflected light, and s-polarized light is light vibrating perpendicular to the plane, which defined by a direction of incident light and a reflecting surface. Therefore, the vibrating direction of the incident light determines whether the light is p-polarized light or s-polarized light based on the incident and emitting direction of light and the reflecting surface. In this invention, as described later, light, even which enters from same direction and vibrates in a same direction, varies between p-polarized light and s-polarized light according to three optical surfaces of the color separating/recombining means 50. In FIGS. 4 to 8, the polarization plane of the polarized light is expressed in an xyz-space. If red light, for example, vibrates in a plane-xy, the red light is referred to as Rxy.

Figure 4:
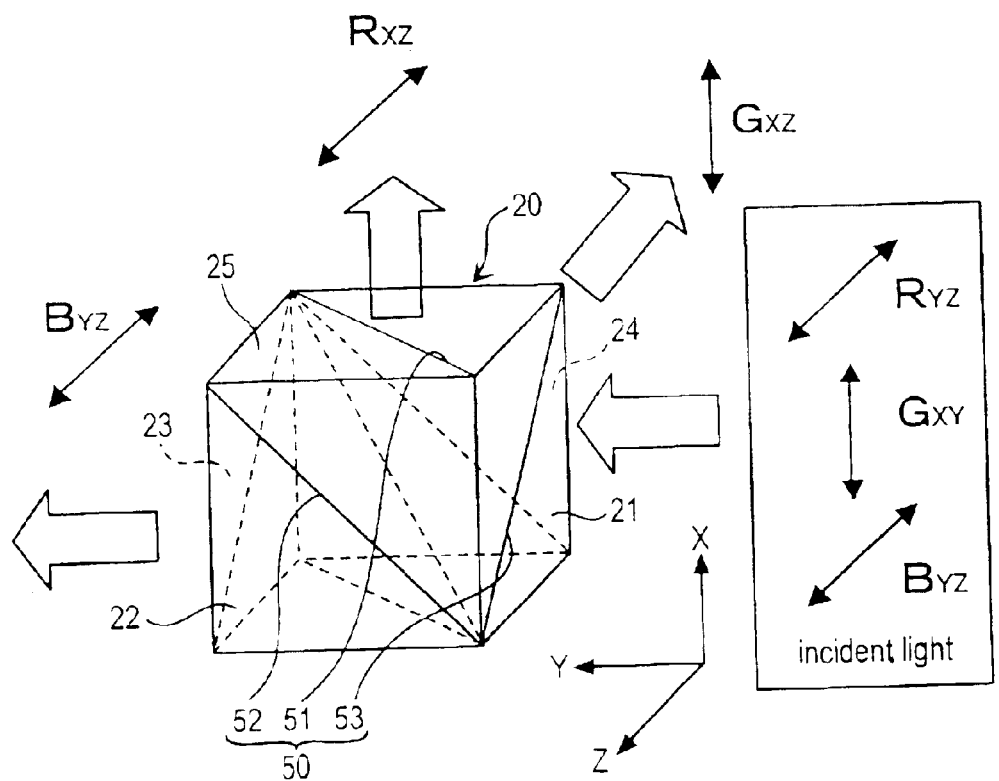
FIG. 4 is a perspective view showing a color separating/recombining unit according to the present invention.

In a perspective view of FIG. 4, a polarization direction indicated by arrowheads with an inclined solid line shows that a plane-yz is a polarization plane of the polarized light. A polarization direction indicated by arrowheads with a vertical solid line shows that a plane-xy is a polarization plane of the polarized light. With respect to the first optical surface 51 of the color separating/recombining unit 20, the plane-yz is p-polarized light, and the plane-xy is s-polarized light.

Although the light output surface 22 facing the projection optical system 40 may be placed at the back of the light incidence surface 21, that is, parallel to the light incidence surface 21, the light output surface 22 in this embodiment is placed on a front surface orthogonal to the light incidence surface 21 of the color separating/recombining means, in order to simplify an internal constitution of the color separating/recombining unit 20 as well as to miniaturize the unit 20.

The three surfaces out of the remaining four surfaces of the color separating/recombining unit 20 are used as a first light incidence/output surface 23 corresponding to a first color component, a second light incidence/output surface 24 corresponding to a second color component, and third light incidence/output surface 25 corresponding to a third color component, which respectively faces LCD panels 31, 32, 33 comprising the reflective light modulating element.

The position between these three light incidence/output surfaces, the light incidence surface 21 and the light output surface 22 can be designed freely in consideration of the polarization direction of three color components and the position of the light incidence surface 21 and the light output surface 22. In this embodiment, as shown in FIGS. 2 and 4, the first light incidence/output surface 23 is placed on a left side surface opposite to the light incidence surface 21 placed on a right side surface of the color separating/recombining unit 20. The second light incidence/output surface 24 is placed at the back side surface opposite to the light output surface 22 placed on a front surface of the color separating/ recombining unit 20. The third light incidence/output surface 25 is placed on an upper surface of the color separating/ recombining unit 20, orthogonal to the light incidence surface 21, the light output surface 22, the first and second light modulating surfaces 23, 24.

Figure 5:
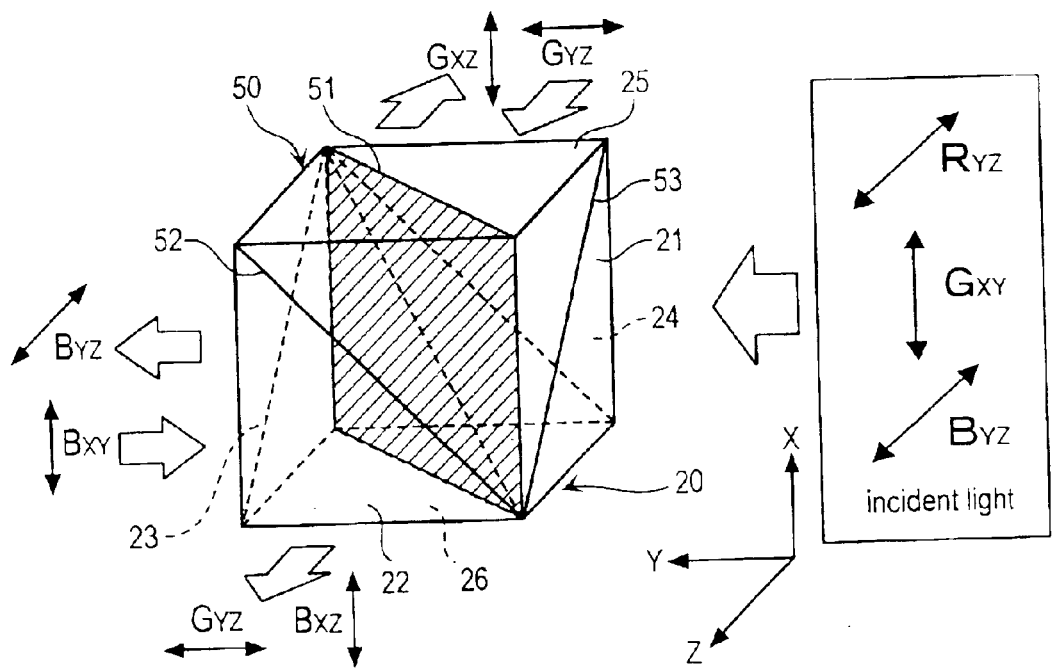
FIG. 5 is a perspective view showing the color separating/recombining unit according to the present invention.

In FIG. 4, the color separating/recombining means 50 has three optical surfaces; a first optical surface 51, a second optical surface 52, and a third optical surface 53. The first optical surface 51, as emphasized by upper right diagonal stripes in the perspective view of FIG. 5, is placed at a 45-degree angle with respect to the light incidence surface 21 and the light output surface 22 and orthogonal to the third light incidence/output surface 25 and a bottom surface 26. When the optical surface 51 in combination with the light incidence surface 21 and the first light incidence/output surface 23 is viewed from above in two-dimensional view, they would look like the letter Z.

Figure 6:
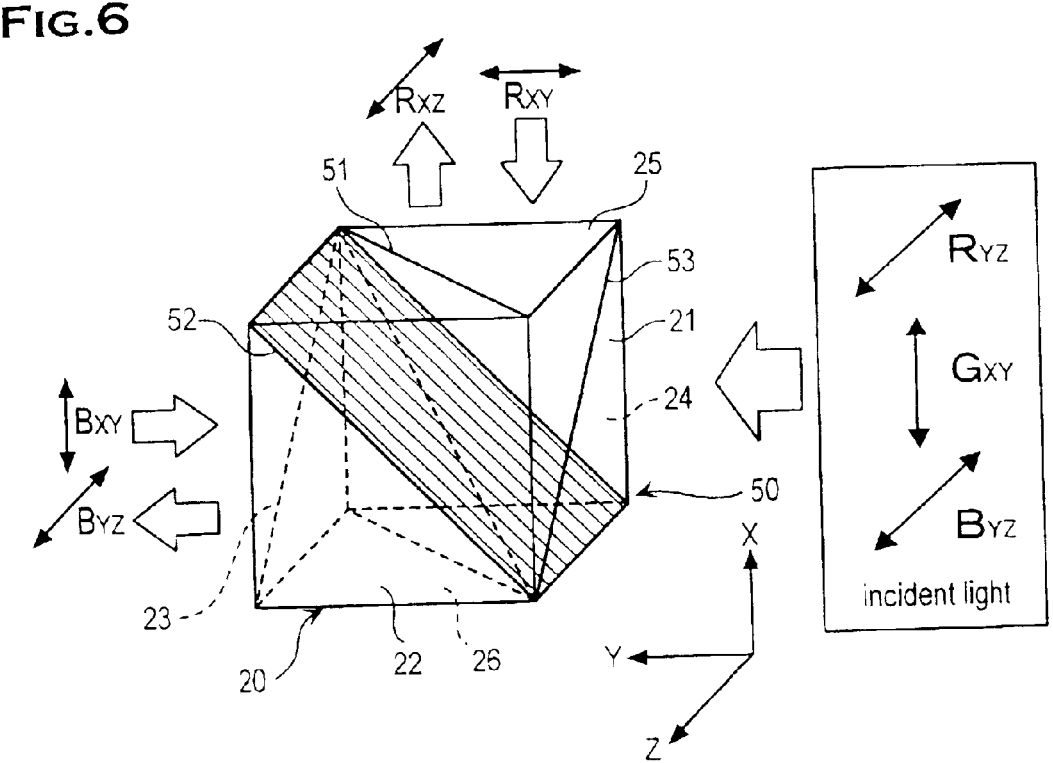
FIG. 6 is a perspective view showing the color separating/recombining unit according to the present invention.

The second optical surface 52, as emphasized by the upper left diagonal stripes in the perspective view of FIG. 6, is placed at a 45-degree angle with respect to the first light incidence/output surface 23 and the third light incidence/ output surface 25 and orthogonal to the second light incidence/output surface 24 and the light output surface 22. When the second optical surface 52 in combination with the third light incidence/output surface 25 and the bottom surface 26 is viewed from the side of the second light incidence/ output surface 24 (from back side), they would look like the letter Z.

Figure 7:
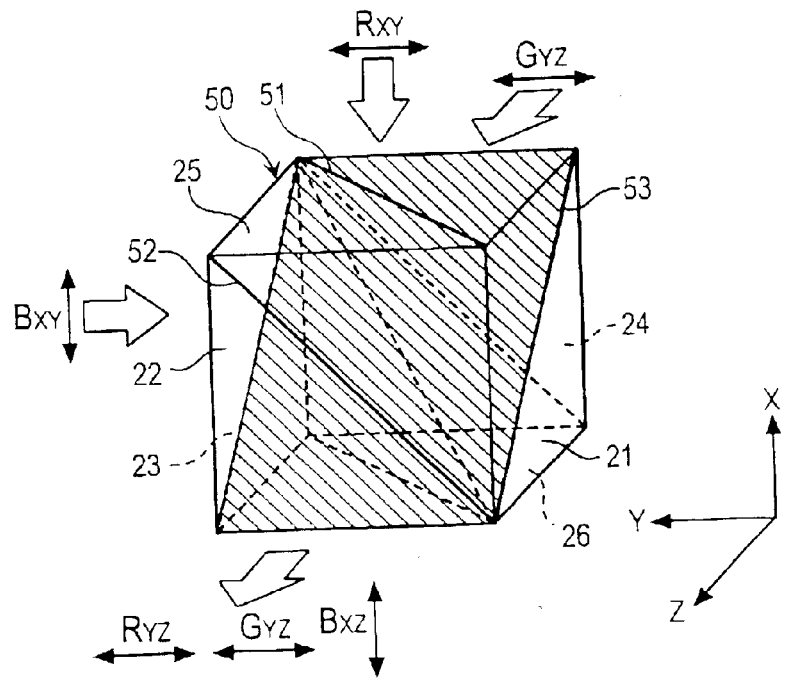
FIG. 7 is a perspective view showing the color separating/recombining unit according to the present invention.

The third optical surface 53, as emphasized by the upper left diagonal stripes in the perspective view of FIG. 7, is placed at a 45-degree angle with respect to the third light incidence/output surface 25 and the light output surface 22 and orthogonal to the light incidence surface 21 and the first light incidence/output surface 23. When the third optical surface 53 in combination with the third light incidence/ output surface 25 and the bottom surface 26 is viewed from the side of the light incidence surface 21, they would look like letter Z.

The first optical surface 51 has a property of functioning as a polarized light separating surface which selectively separates only the polarized light with a particular wavelength as shown in a table 1. Specifically speaking, the first optical surface 51 reflects s-polarized light of the blue component as a first color component (referred to as "B" in tables below) and s-polarized light of the green component as a second color component (referred to as "G" in tables below), and transmits p-polarized light of the blue component as a first color component, p-polarized light of the green component as a second color component and s- and p-polarized light of the red component as a third color component (referred to as "R" in tables below).

The second optical surface 52 has a property of functioning as a polarized light separating surface which selectively separates only the polarized light with a particular wavelength as shown in table 2. Specifically speaking, the second optical surface 52 reflects only s-polarized light of the red component and transmits p-polarized light of the red component, p- and s-polarized light of the green component and p- and s-polarized light of the blue component.

The third optical surface 53 has a property of functioning as a polarized light separating surface which selectively separates only the polarized light with a particular wavelength as shown in table 3. Specifically speaking, the third optical surface 53 reflects only s-polarized light of the red component and transmits p-polarized light of the red component, p- and s-polarized light of the green component and p- and s-polarized light of the blue component.

TABLE 1 property of first optical surface

| color component | s-polarized light | p-polarized light |
| --- | --- | --- |
| B | reflected | transmittable |
| G | reflected | transmittable |
| R | transmittable | transmittable |

TABLE 2 property of second optical surface

| color component | s-polarized light | p-polarized light |
|---|---|---|
| B | transmittable | transmittable |
| G | transmittable | transmittable |
| R | reflected | transmittable |

TABLE 3 property of third optical surface

| color component | s-polarized light | p-polarized light |
|---|---|---|
| B | transmittable | transmittable |
| G | transmittable | transmittable |
| R | reflected | transmittable |

The properties of the second optical surface 52 and the third optical surface 53 are the same as apparent from the tables 2 and 3. Hence, it is enough for the color separating/recombining means 50 to include one surface having the same property as the first optical surface 51 and two surfaces having the same property as the second optical surface 52 or the third optical surface 53.

When using such color separating/recombining unit 20, as shown in FIGS. 4, 5, and 6, a blue component Byz incident from the light incidence surface 21, whose polarization plane is the plane-yz, is p-polarized light with respect to the first optical surface 51, thereby passing through the first optical surface 51 as the blue component Byz. Although the blue component Byz is s-polarized light with respect to the second optical surface 52, the blue component Byz can pass through the second optical surface 52 since the second optical surface 52 has the property of transmitting s-polarized light. Then, the blue component Byz can be emitted from the first light incidence/output surface 23 as the blue component Byz without obstruction by either of the first or second optical surface 51, 52.

Since the green component Gxy incident from the light incidence surface 21, whose polarization plane is the plane-xy, is s-polarized light with respect to the first optical surface 51, the green component Gxy reflects by 90 degrees off the first optical surface 51 and emitted from the second light incidence/output surface 24 as the green component Gxz whose polarization plane is the plane-xz.

The red component Ryz incident from the light incidence surface 21, whose polarization plane is the plane-yz, is p-polarized light with respect to the first optical surface 51, as shown in FIGS. 4, 5 and 6, and passes through the first optical surface 51 as the red component Ryz. Since the red component Ryz is s-polarized light with respect to the second optical surface 52, the red component Byz reflects upward by 90 degrees off the second optical surface 52 because the surface 52 has the property of reflecting the s-polarized light of red component. Then the red component Ryz is emitted from the third light incidence/output surface 25 as a red component Rxz whose polarization plane is the plane-xz.

The LCD panels 31, 32, 33 respectively reflect light, which entered pixels to be displayed, in the opposite direction to the incident direction by rotating the polarization direction of light by 90 degrees. Also, the LCD panels 31, 32, 33 reflect light, which entered other pixels not to be displayed, in opposite direction to the incident direction without rotating the polarization direction of the light.

Thus, the blue component Byz emitted from the first light incidence/output surface 23 is modulated in the first LCD panel for blue 31 and enters the first light incidence/output surface 23 as blue image light converted into a blue component Bxy whose polarization plane is the plane-xy. The blue component blue component Bxy incident from the first light incidence/output surface 23 is s-polarized light with respect to the first optical surface 51, reflects by 90 degrees off the first optical surface 51 and is emitted from the light output surface 22 as a blue component Bxz whose polarization plane is the plane-xz. Since the second and third optical surfaces 52 and 53 have the property of transmitting s-polarized light and p-polarized light of the blue component, the blue component Bxz can be emitted from the light output surface 22 without obstruction by either of the optical surface 52 or 53.

Figure 8:
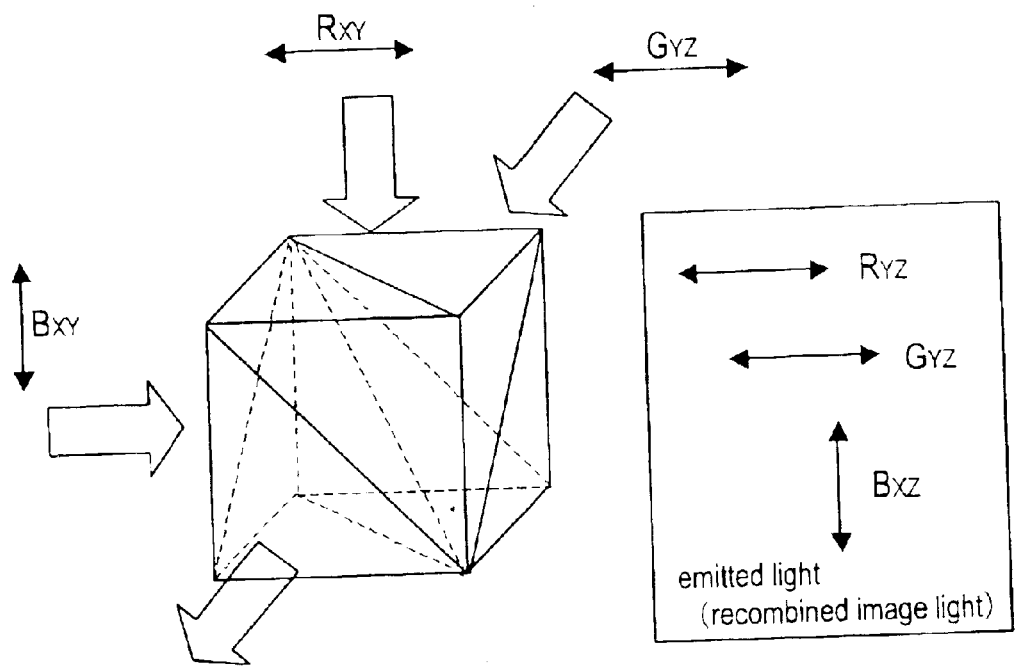
FIG. 8 is a perspective view showing the color separating/recombining unit according to the present invention.

The green component Gxz emitted from the second light incidence/output surface 24 is modulated in the second LCD panel for green 32 and enters the second light incidence/output surface 24 as green image light converted into a green component Gyz whose polarization plane is the plane-yz. The green component Gyz incident from the light incidence/output surface 24 is p-polarized light with respect to the first optical surface 51, as shown in FIGS. 5, 7, and 8, and is emitted from the light output surface 22 through the first optical surface 51. Since the second and third optical surface 52, 53 have the property of transmitting s-polarized light and the p-polarized light of the green component, the green component Gyz can be emitted from the light output surface 22 without obstruction by either of the optical surface 52 or 53.

The red component Rxz emitted from the third light incidence/output surface 25 is modulated in the third LCD panel for red 33 and enters the third light incidence/output surface 25 as red image light converted into a red component Rxy whose polarization plane is the plane-xy. The red component Rxy incident from the light incidence/output surface 25 is p-polarized light with respect to the second optical surface 52, as shown in FIGS. 6, 7, and 8, and passes through the second optical surface 52. The red component Rxy is s-polarized light with respect to the third optical surface 53, is reflected forward on the third optical surface 53 and is emitted from the light output surface 22 as a red component Ryz. Since the first optical surface 51 has the property of transmitting s-polarized light and p-polarized light of the red component, the red component Ryz can be emitted from the light output surface 22 without obstruction by the first optical surface 51.

In the other words, the first optical surface 51 has functions of separating the green component of the second color component from light emitted from the light source unit 10 and recombining the blue image light of the first color component reflected from the first LCD panel 31 and the green image light of the second color component incident from the second LCD panel 32. The second optical surface 52 has functions of separating the red component of the third color component from light incident from the light source unit 10. The third optical surface 53 has functions of recombining the recombined blue and green image lights as the first and second color components and the red image light of the third color component incident from the third LCD panel 33.

Figure 9:
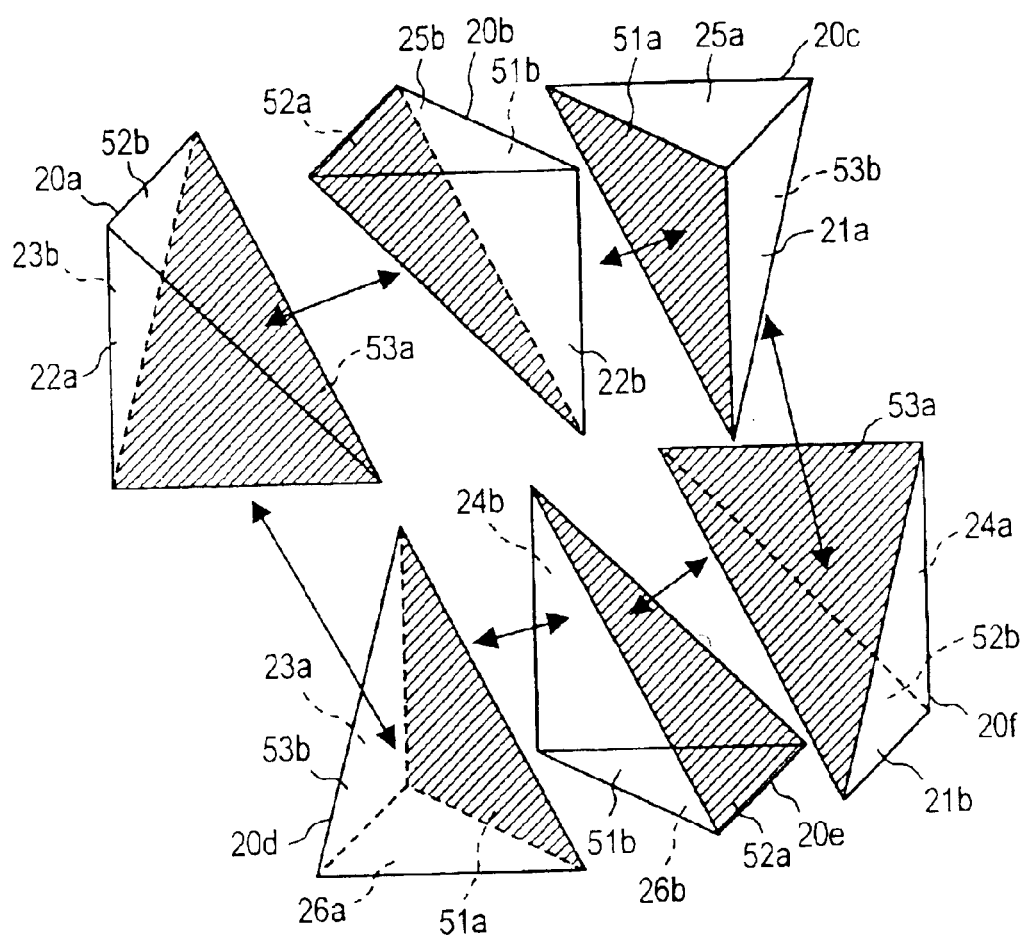
FIG. 9 is a perspective view showing disassembled pieces of the color separating/recombining unit according to the present invention.

Although there is no restriction on fabricating the method of the color separating/recombining unit 20, one example is shown in the exploded perspective view of FIG. 9. First, a cube of the color separating/recombining unit 20 is divided at optical surfaces 51, 52, and 53 into six tetrahedrons 20a–20f. Next, optical areas 51a–53a are formed at one side (or both sides) of the joint surfaces 51a–53a and 51b–53b, which are facing each other, of the tetrahedrons 20a–20f. Then the joint surfaces 51a–53a opposed to the joint surfaces 51b–53b of tetrahedrons 20a–20f are jointed each other by bonding or fusion. According to the above described method, the color separating/recombining unit 20 can be fabricated readily with high-accuracy.

In FIG. 9, the reference numbers 21a and 21b, 22a and 22b, 23a and 23b, 24a and 24b, 25a and 25b and 26a and 26b respectively represent the divided light incidence surfaces, the divided light output surfaces, the divided first light incidence/output surfaces, the divided second light incident/output surfaces, the divided third light incidence/output surfaces and the divided another surfaces (bottom surfaces).

A first tetrahedron 20a consists of a light output surface 22a and a first light incidence/output surface 23b in the form of an isosceles right-angled triangle and an optical surface 53a and a joint surface 52b in the form of a right-angled triangle. A second tetrahedron 20b consists of a light output surface 22b and a third light incidence/output surface 25b in the form of an isosceles right-angled triangle and an optical surface 52a and a joint surface 51b in the form of a right-angled triangle.

A third tetrahedron 20c consists of a light incidence surface 21a and a third light incidence/output surface 25b in the form of an isosceles right-angled triangle and an optical surface 51a and a joint surface 53b in the form of a right-angled triangle. A fourth tetrahedron 20d consists of a first light incidence/output surface 23a and another surface 26a in the form of an isosceles right-angled triangle and an optical surface 51a and a joint surface 53b in the form of a right-angled triangle.

A fifth tetrahedron 20e consists of a second light incidence/output surface 24b and another surface 26b in the form of an isosceles right-angled triangle and an optical surface 52a and a joint surface 51b in the form of a right-angled triangle. A sixth tetrahedron 20f consists of a light incidence surface 21b and a second light incidence/output surface 24a in the form of an isosceles right-angled triangle and an optical surface 53a and a joint surface 52b in the form of a right-angled triangle.

The recombined three primary color component (image light) enters the projection optical system 40 from the light output surface 22 and is magnified and projected by the projection optical system 40. As shown in FIG. 2, the LCD projector in this embodiment, when necessary, may comprise a narrow-band retardation plate 41 which converts p-polarized light of the green component to s-polarized light of the green component by rotating its polarization direction 90 degrees, and a polarizing plate 42 which transmits s-polarized light of each color component in order to improve contrast of the recombined image light before it enters the projection lens system 43 to be magnified and projected.

As described above, the color separating/recombining unit 20 in this embodiment is formed in a cube and comprises a light incidence surface 21 facing the light source unit 10 which emits light having a predetermined polarization direction, three light incidence/output surfaces 23, 24, 25 respectively facing the LCD panels 31, 32, 33, a light output surface 22 facing the projection optical system 40, and another surface 26. The color separating/recombining unit 20 also comprises a color separating/recombining means 50 inside. The color separating/recombining means 50 separates light emitted from the light source unit 10 into three primary color components and emits the separated color components respectively from the corresponding light incidence/output surfaces 23, 24, 25. After the LCD panels 31, 32, 33 each placed opposite to the light incidence/output surfaces 23, 24, 25 rotate the polarization direction of the color components by 90 degrees and reflect them, the color separating/recombining means 50 recombines the three primary color components to emit from the light output surface 22 toward the projection optical system 40.

Figure 10:
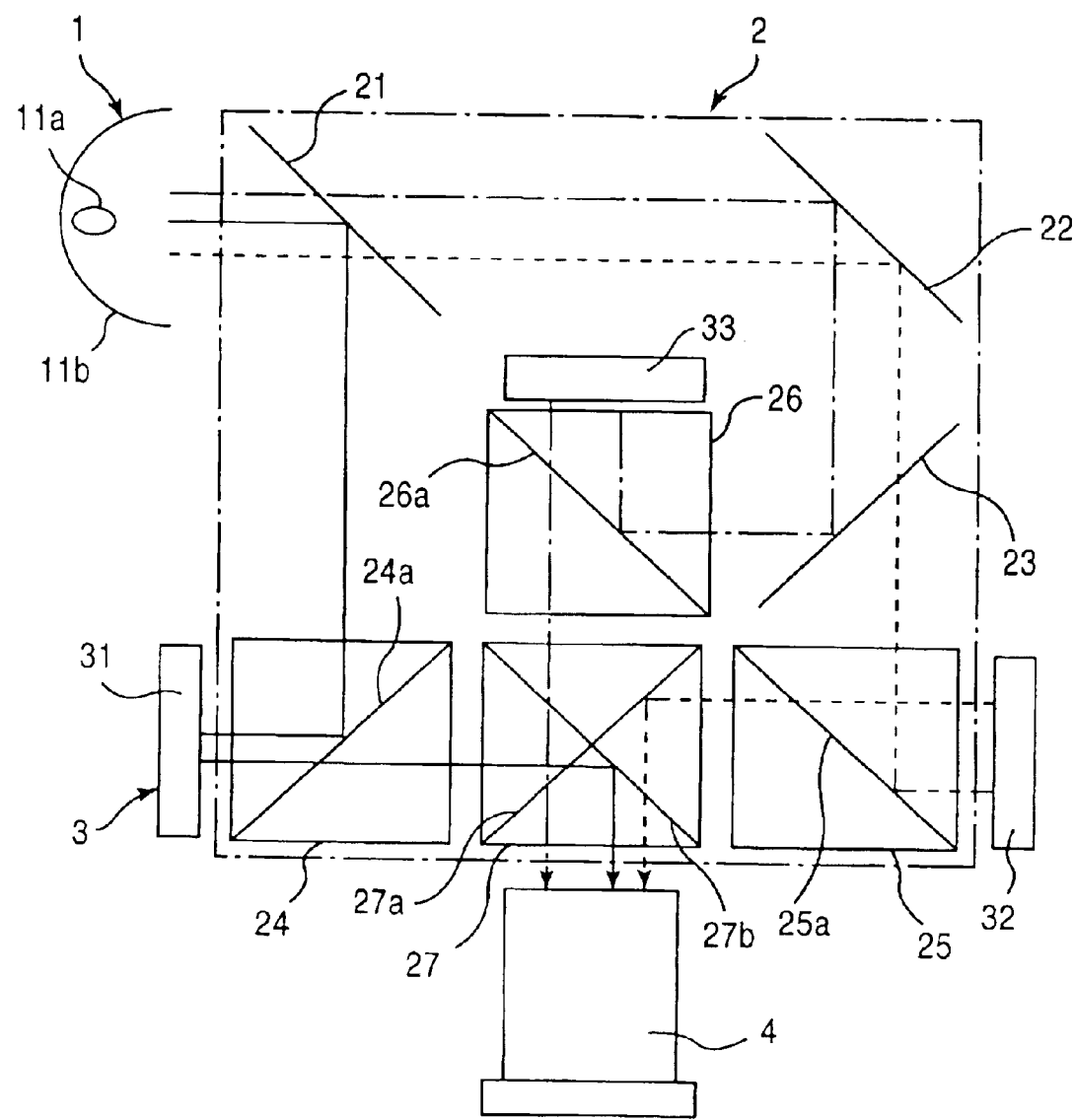
FIG. 10 is a plan showing a conventional LCD projector.
Figure 11:
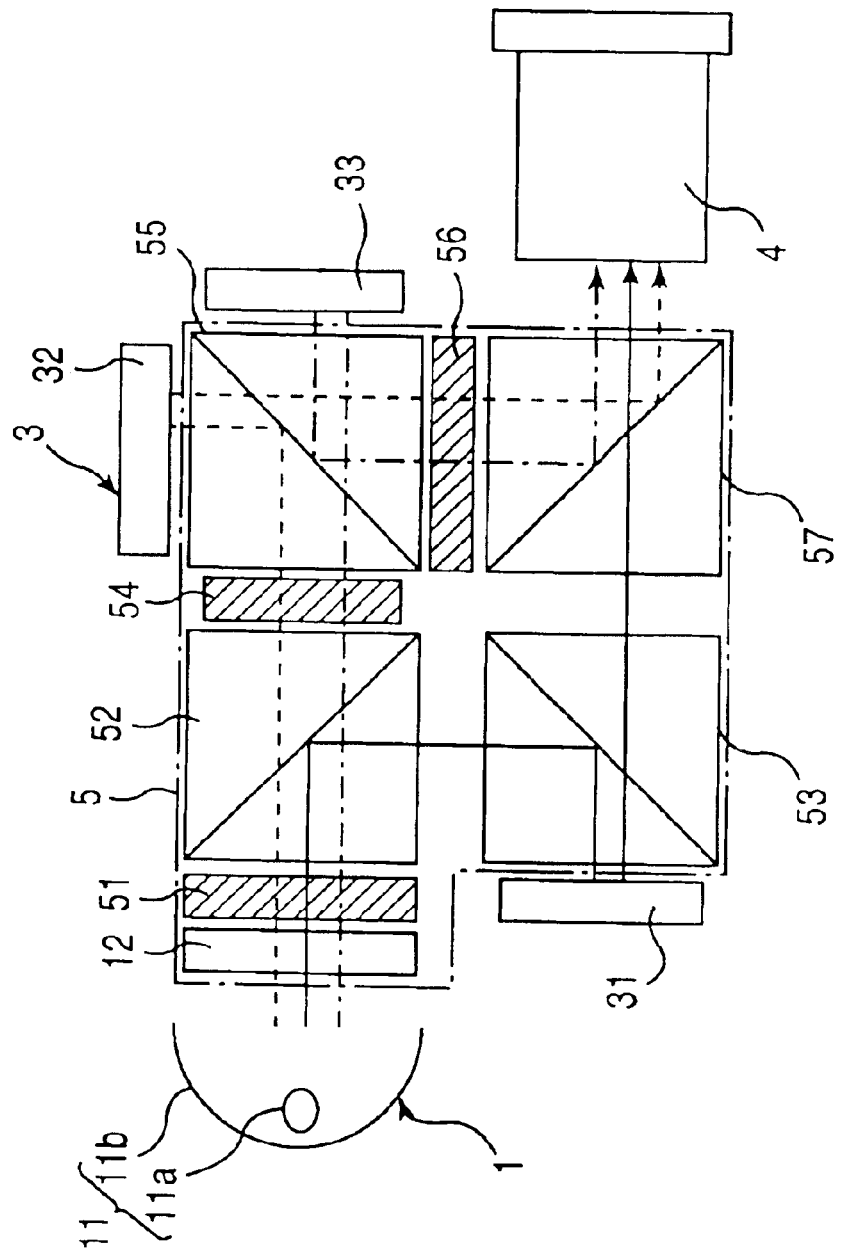
FIG. 11 is a plan showing another conventional LCD projector.

In this configuration, one side of each surface of the color separating/recombining unit 20 can be shorten to a length as same as one side of the LCD panels 31, 32, 33 (if the LCD panels 31, 32, 33 are rectangular, a longer side of it). Therefore, the LCD projector using three LCD panels can carry out separation and recombination of color components in one-ninth of the area of the conventional projector in FIG. 10 as well as one-fourth of the area of the conventional projector in FIG. 11. In short, a remarkably compact color separating/recombining unit 20 can be obtained as compared to a conventional color separating/recombining unit, resulting in a remarkably compact LCD projector using the unit 20.

Further, the path length for each color component between the light source unit 10 and the projection optical system 40 can be shorten to approximately one-third as compared to a conventional one, thereby decreasing the loss of light. This allows the light source unit 10 to reduce its power output, cost and size. Hence, the further miniaturized LCD projector can be provided at a low cost.

Furthermore, since the path length for each color component between each LCD panel 31, 32, 33 and the projection optical system 40 can be shorten to approximately a half as compared to a conventional one, a diffusion of each color component can be decreased, thereby miniaturizing the projection optical system 40. Hence, the further miniaturized LCD projector can be provided.

In addition, a small number of parts help sharply cut costs for assembling the LCD projector.

As described above, the color separating/recombining unit in this invention is formed in a cube and comprises a light incidence surface facing a light source unit which emits light having a predetermined polarization direction, three light incidence/output surfaces each facing reflective light modulating elements, a light output surface facing a projection optical system, and another surface. The color separating/recombining unit also comprises a color separating/recombining means inside. The color separating/recombining means separates light emitted from the light source unit into three primary color components and emits the separated color components respectively from the corresponding light incidence/output surface. After the reflective light modulating elements each placed opposite to the light incidence/output surfaces rotate the polarization direction of the color components by 90 degrees and reflect them, the color separating/recombining means recombines the three primary color components to emit from the light output surface toward the projection optical system.

In this configuration, a remarkably compact color separating/recombining unit can be obtained as compared to conventional color separating/recombining units, thereby obtaining a remarkably compact LCD projector with three LCD panels as compared to the conventional LCD projector with three LCD panels by using the color separating/recombining unit.

Further, the path length for each color component between the light source unit and the projection optical system can be shorten to approximately one-third as compared to a conventional one, thereby decreasing loss of light. This allows the light source unit to reduce its power output, cost and size. Hence, the further miniaturized LCD projector can be provided at a low cost as well as reduce power consumption.

Furthermore, since the path length for each color component between the LCD panel and the projection optical system can be shorten to approximately one-third as compared to a conventional one, a diffusion of each color component, which occurs between the LCD panels and the projection optical system, can be decreased, resulting in miniaturization of the projection optical system. Hence, the further miniaturized LCD projector can be provided. In addition, a small number of parts help sharply cut costs for assembling the LCD projector.

Industrial Applicability

As described in the foregoing, the color separating/recombining unit according to the present invention is used for LCD projector using three reflective LCD panels, and especially is suitable for miniaturization of the LCD projector.

What is claimed is:

1. A color separating/recombining unit which is formed in a cube and comprises:
    a light incidence surface directly facing a light source unit which emits light having a predetermined polarization direction;
    three light incidence/output surfaces each facing reflective light modulating elements;
    a light output surface facing a projection optical system;
    another surface; and
    a cubical color separating/recombining means inside wherein
        the cubical color separating/recombining means for separating light emitted from the light source unit into three primary color components, for emitting the separated components from the light incidence/output surfaces and for recombining the three color components which are rotated their polarization directions by 90 degrees and reflected by the reflective light modulating elements placed opposite to light incidence/output surfaces, and emits the recombined color component directly toward the projection optical system, wherein said light incidence surface, said three light incidence/output surfaces, said light output surface and said another surface each constitute different surfaces of said cube.

2. The color separating/recombining unit according to claim 1, wherein
    the light incidence surface and the light output surface are orthogonal to each other;
    a first light incidence/output surface is positioned opposite of the light incidence surface;
    a second light incidence/output surface is positioned opposite the light output surface; and
    a third light incidence/output surface is orthogonal to the first and second incident/output surfaces.

3. The color separating/recombining unit according to claim 1, wherein
    the color separating/recombining means comprises a first optical surface inclined at a 45-degree angle to the light incidence surface and the light output surface, a second optical surface inclined at a 45-degree angle to the first and third light incidence/output surfaces, and a third optical surface inclined at a 45-degree angle to the third light incidence/output surface and the light output surface.

4. LCD projector comprising:
    a color separating/recombining unit which is formed in a cube and comprises a light incidence surface facing a light source unit which emits light having a predetermined polarization direction, three light incidence/output surfaces each facing reflective light modulating elements, a light output surface facing a projection optical system, another surface, and a color separating/recombining means inside, wherein the color separating/recombining means for separating light emitted from the light source unit into three primary color components, for emitting the separated components from the corresponding light incidence/output surfaces, for recombining the three color components which are rotated their polarization directions by 90 degrees and reflected by the reflective light modulating elements placed opposite to light incidence/output surfaces, and emits the recombined color component toward the projection optical system;
    a light source unit arranged on a light incidence surface side of the color separating/recombining unit and emitting light having a predetermined polarization direction;
    first, second, and third reflective light modulating elements respectively arranged on light incidence/output surface sides of the color separating/recombining unit; and
    a projection optical system arranged on a light output surface side of the color separating/recombining unit, wherein said light incidence surface, said three light incidence/output surfaces, said light output surface and said another surface each constitute different surfaces of said cube.

5. The LCD projector according to claim 4, wherein
    the light incidence surface and the light output surface are orthogonal to each other,
    the first light incidence/output surface is positioned opposite the light incidence surface,
    the second light incidence/output surface is positioned opposite the light output surface,
    the third light incidence/output surface is orthogonal to the first and second incidence/output surfaces.

6. The LCD projector according to claim 4, wherein
    the color separating/recombining means comprises a first optical surface inclined at a 45-degree angle to the light incidence surface and the light output surface, a second optical surface inclined at a 45-degree angle to the first and third light incidence/output surfaces, and a third optical surface inclined at a 45-degree angle to the third light incidence/output surface and the light output surface.

7. The LCD projector according to either claim 4, 5 or 6, wherein
    the light source unit comprises a white light source, a polarization conversion means for arranging light from the white light source to have a predetermined polarization direction, and means for rotating a polarization direction of light having a particular wavelength by 90 degrees.

* * * * *